United States Patent [19]

Mullane

[11] Patent Number: 4,784,211
[45] Date of Patent: Nov. 15, 1988

[54] APPARATUS FOR INTERCELL FUSION OF BATTERY CONNECTIONS

[75] Inventor: William E. Mullane, Warren, Ohio

[73] Assignee: The Taylor-Winfield Corporation, Warren, Ohio

[21] Appl. No.: 46,679

[22] Filed: May 7, 1987

[51] Int. Cl.⁴ .................... B22D 19/04; B22D 23/06
[52] U.S. Cl. .................................. 164/513; 164/80; 164/493; 164/DIG. 1
[58] Field of Search .............. 164/338.1, DIG. 1, 493, 164/513, 80; 249/78

[56] References Cited

U.S. PATENT DOCUMENTS

| | | | |
|---|---|---|---|
| 1,302,699 | 5/1919 | Noble et al. | 164/DIG. 1 X |
| 2,978,762 | 4/1961 | McAlpine | 164/338.1 X |
| 3,200,450 | 8/1965 | Buttke | 164/DIG. 1 X |
| 3,493,035 | 2/1970 | Tiegel et al. | 164/DIG. 1 X |
| 3,598,171 | 8/1971 | Schulz | 249/78 X |
| 3,861,575 | 1/1975 | Eberle | 164/DIG. 1 X |
| 4,102,638 | 7/1978 | Tiegel | 164/DIG. 1 X |

FOREIGN PATENT DOCUMENTS 1271089  4/1972  United Kingdom ......... 164/DIG. 1

Primary Examiner—Nicholas P. Godici
Assistant Examiner—J. Reed Batten, Jr.
Attorney, Agent, or Firm—William J. Ruano

[57] ABSTRACT

Intercell fusing apparatus for use in a battery having flat tombstone type connections, each tombstone having a pair of vertically and horizontally outwardly extending portions of fusible material closely surrounding a vertical partition of electrically insulating material having a hole extending horizontally therethrough. It comprises a mold closely surrounding each pair of vertical portions of the tombstones and surrounding a partition portion above the hole, and a pair of interconnected coils preferably having double windings on each side of the partition to effect fusion of the tombstones within the mold when energized by a source of high frequency alternating current.

8 Claims, 5 Drawing Sheets

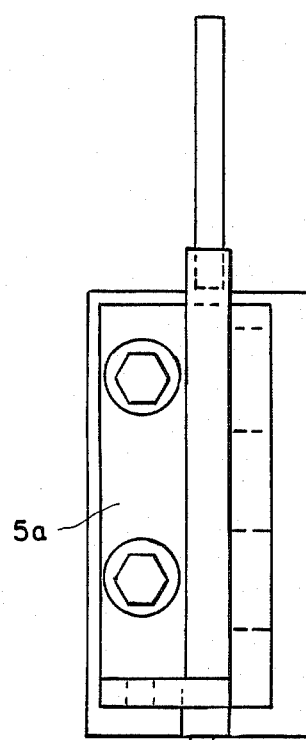
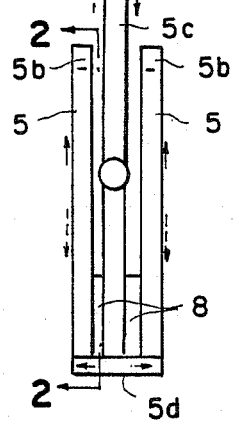
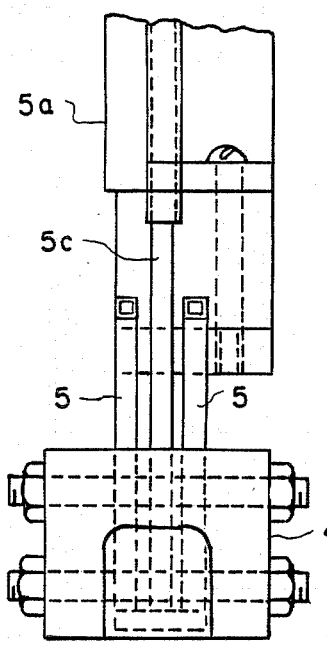
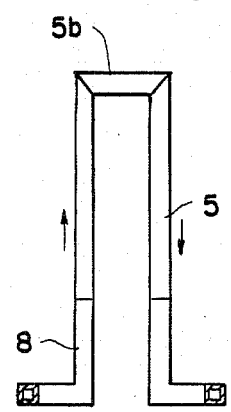
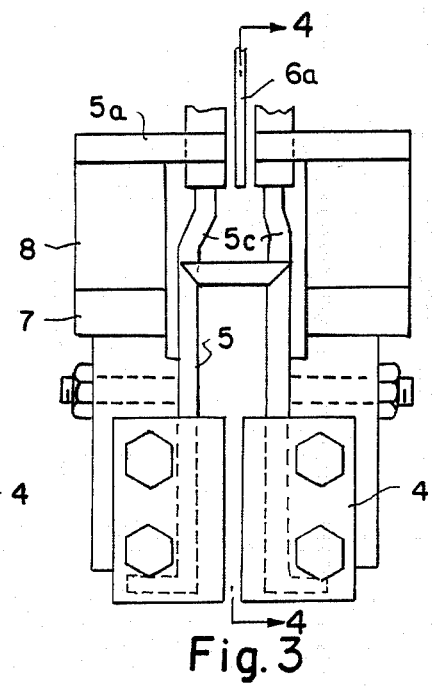
Fig. 1
Fig. 2
Fig. 4
Fig. 3

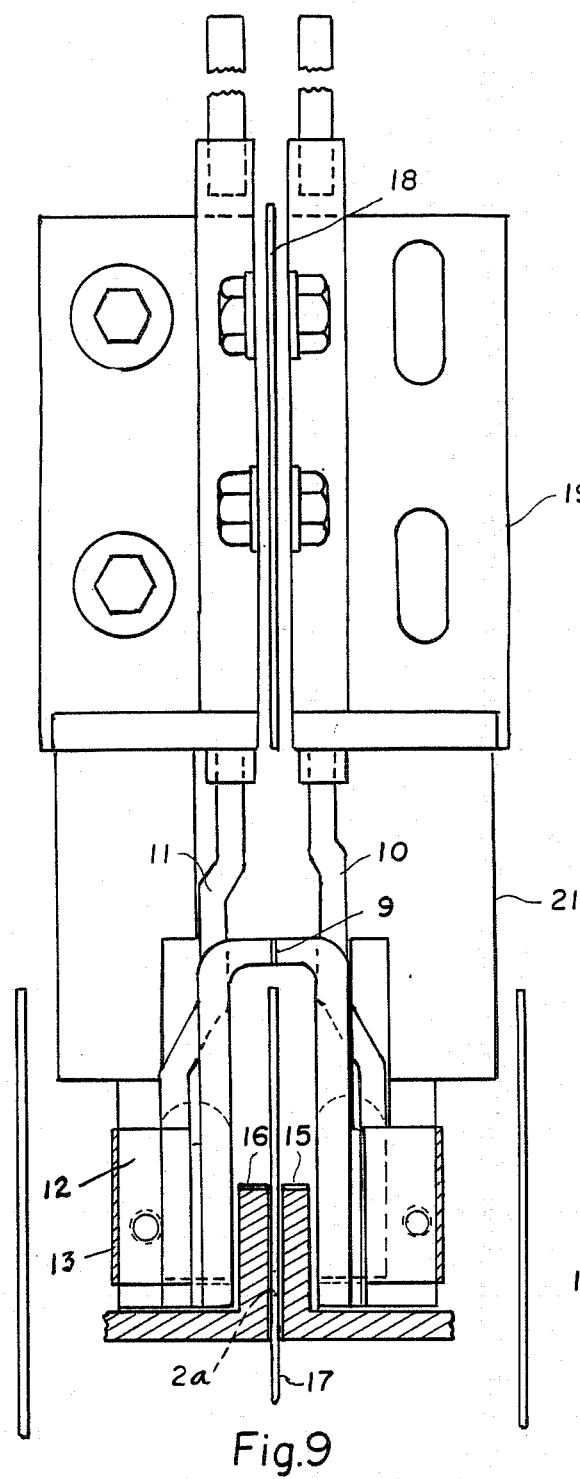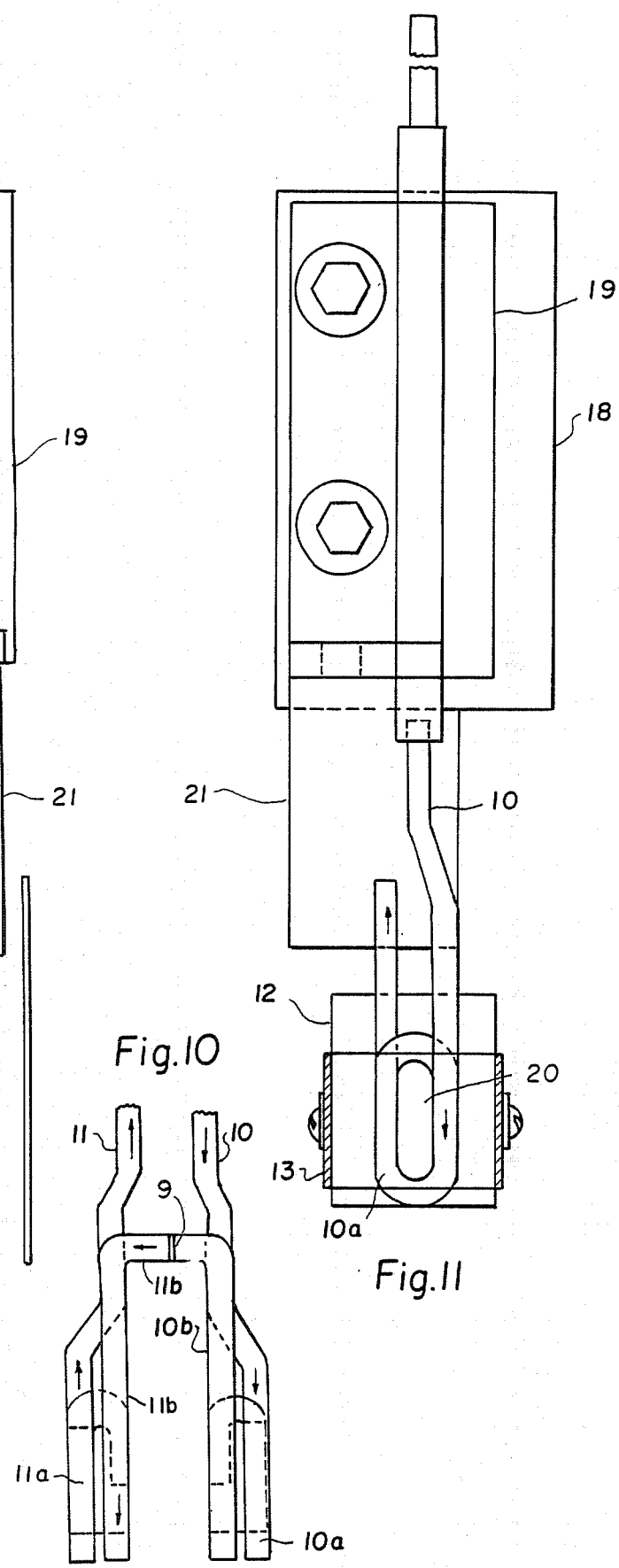
Fig.9  Fig.10  Fig.11

APPARATUS FOR INTERCELL FUSION OF BATTERY CONNECTIONS

This invention relates to a method and apparatus for fusing intercell, flat tombstone type connections for a storage battery.

BACKGROUND OF THE INVENTION

Generally, in the past, intercell fusion for a flat tombstone type connection through a partition in a lead acid storage battery has been made singly for each partition. This had the disadvantage of being very time consuming, adding considerably to manufacturing costs.

SUMMARY OF THE INVENTION

An object of the invention is to overcome the above-named disadvantage by providing a novel method and apparatus for quickly fusing, at the same time, connections between a plurality of partitions and their interconnections.

A more specific object is to surround each tombstone type interconnection with a mold which, in turn, is surrounded by an inverted U-shaped induction coil; thereby upon energization of the coil, the upper portion of the tombstone will fuse and fill the hole in a partition.

BRIEF DESCRIPTION OF THE DRAWINGS

FIG. 1 is a front view and FIG. 2 is a side view taken along line 2—2 of FIG. showing an induction coil of the present invention;

FIG. 3 is a front view and FIG. 4 is a sectional view, taken along line 4—4 of FIG. 3, showing a segmental part of a coil;

FIGS. 9 and 11 are front and side views, in cross-section of a complete assembly ready for operation;

FIG. 10 is a front view of the coil shown in FIGS. 9 and 11;

DESCRIPTION OF THE PREFERRED EMBODIMENT

Figure 7:
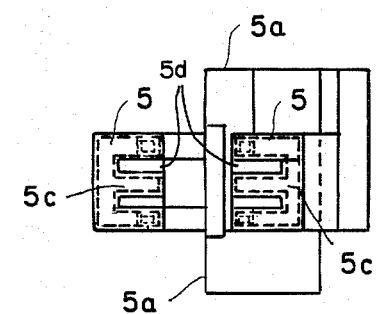
FIG. 7 is a top view of the coil shown in FIGS. 1 and 2.

Referring more particularly to FIGS. 1, 2 and 7, numeral 5 denotes two inverted U-shaped induction coils connected in series and having bottom connecting portions 5d and having lead-in portions 5c and intermediate epoxy resin blocks 8,8 (similar to 20 of FIGS. 12–13) and spacer 8. As shown more clearly in FIG. 7, induction coils 5 are tubular and of rectangular cross-section. Referring to FIG. 1, current flow from the front coil is illustrated by full line arrows, whereas the current flow in the rear coil, which is not seen in FIG. 1, is illustrated by dotted arrows. Thus, current will flow downwardly in lead-in 5cthence along the lower connecting portion 5d, then upwardly of the front coil portions to the top interconnecting portion 5b, thence downwardly in the other coil which is hidden from FIG. 1 in the direction shown in dotted arrows to portion 5d thence upwardly to the other terminal 5c. Thus the two coils of inverted U-shaped are connected in series. In some instances they may be connected in parallel.

Figure 5:
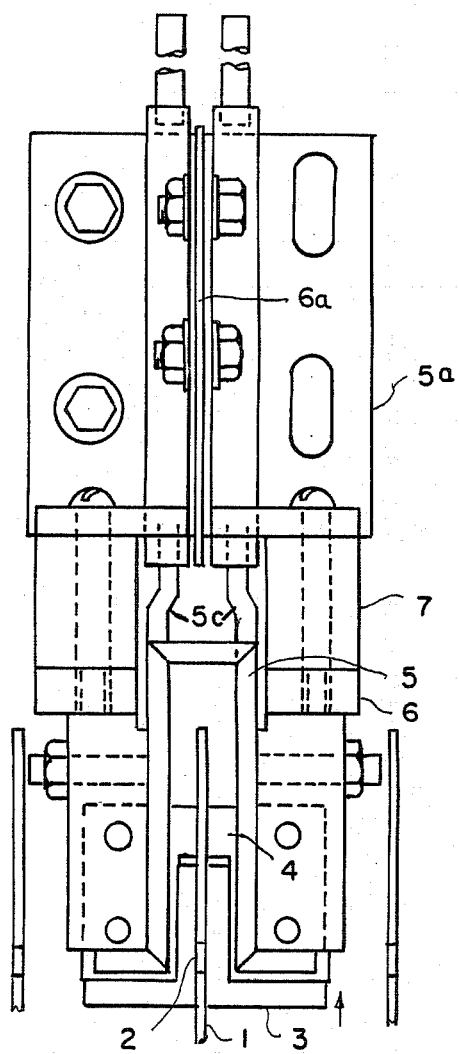
FIG. 5 is a front view and FIG. 6 is a top view with parts removed of the induction coil together with the tombstone terminals, partition and mold.
Figure 6:
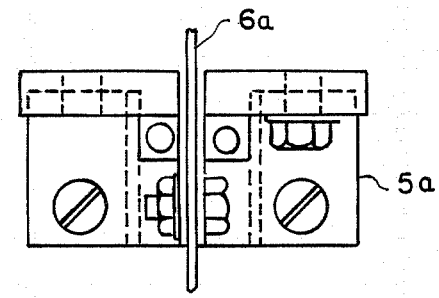

FIG. 5 is a front view, together with a tombstone and a vertical partition and mold after they are moved upwardly in place for fusion.

Referring to FIG. 5, numeral 1 denotes a vertical partition of electrical insulating material, such as polypropylene, having a hole 2 and closely surrounded by a pair of tombstone terminals 3 of lead each having a vertical portion and a horizontally outwardly extending portion, the latter having superimposed and snugly fitted, correspondingly shaped horizontal portions of a tombstone mold 4, such as of glass-filled Teflon. A support block 6 and a spacer 7 are provided. The lead-ins 5c, 5c are insulated from each other by insulator 6a which is snugly sandwiched between fins or terminals 5a, 5a of the coils 5, 5.

Figure 5A:
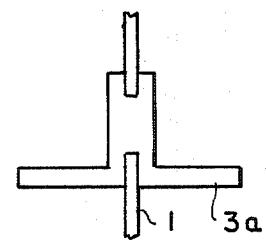
FIG. 5a shows the tombstone and partition after fusion.

In operation, beginning with the assembly shown in FIGS. 3 and 4, the tombstone pair and partition 1 therebetween, as well as the mold 4 are lifted upwardly into place as shown in FIG. 5. Alternating current of a frequency of about 275 KHZ is applied about 4.2 seconds or about 550 KHZ is applied for about 3.5 seconds to effect fusion of the upper portion of the tombstone 3 and, by virtue of the mold 4, will be guided into the hole 2 to form an electrical bridge between the tombstones 3a as shown in FIG. 5a. After a cooling time of about 5 seconds, the tombstones 3, partition 1 and mold 4 may be lowered.

Figure 8:
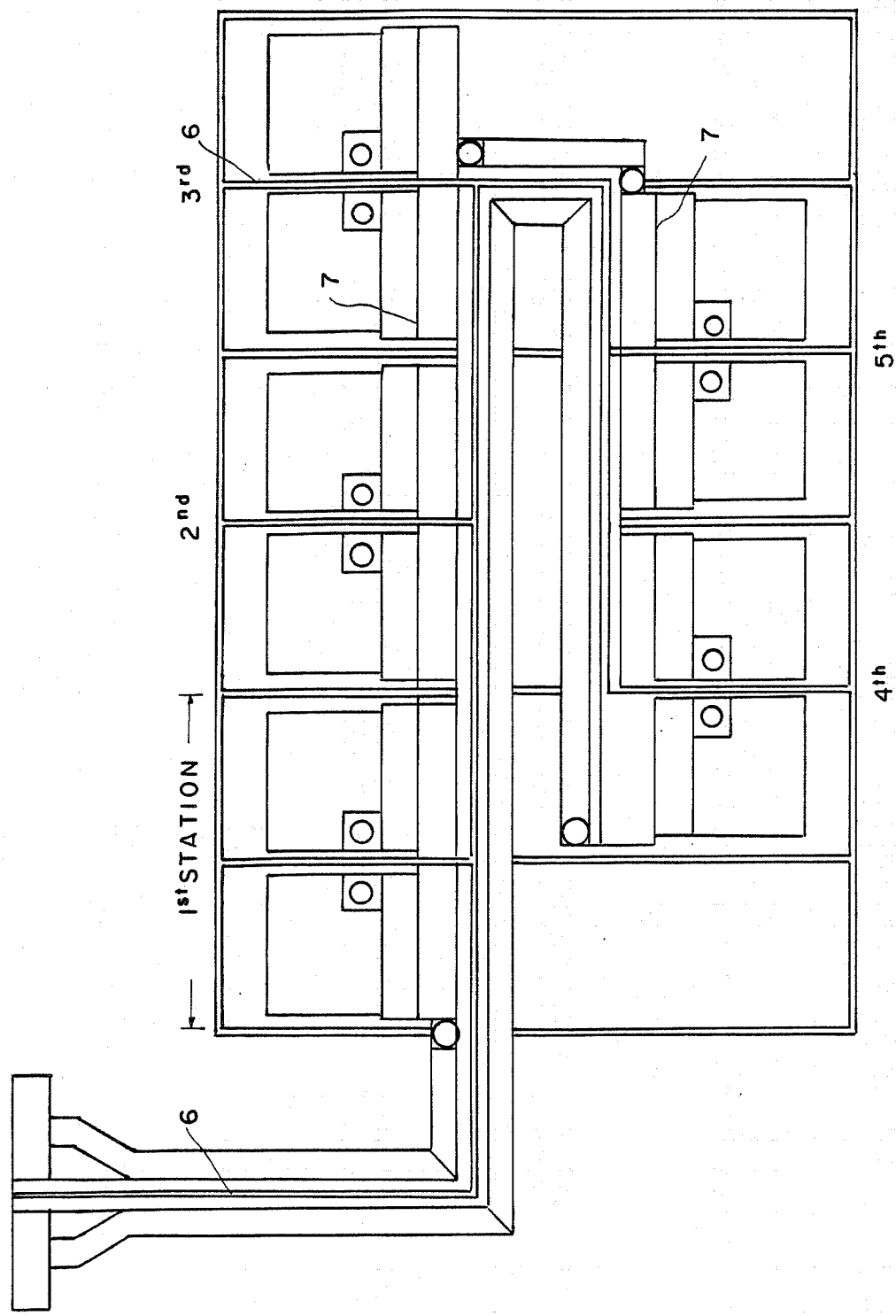
FIG. 8 shows a modification involving five stations of apparatus shown in FIGS. 1–7.

Instead of fusing a connection between only a pair of tombstones 3, a plurality of pairs of tombstones may be simultaneously bridged by the modification shown in FIG. 8, wherein the first station is the apparatus described in FIGS. 1 to 7 inclusive, and the subsequent 2nd, 3rd, 4th and 5th stations, each include identical constructions and have induction coils which are all connected in series for "gang" operation of a plurality of pairs of tombstone connections to their respective vertical partitions. While five stations have been shown, any other number of stations, namely two or more or beyond 5 may be used instead for gang operation to greatly speed production and greatly reduce costs of manufacture.

To avoid the tendency of leakage down the outer surfaces of partition 1 and of the tombstones (FIG. 5), a clamp of any suitable type (not shown) may be clamped onto the outer surfaces of the mold before effecting fusion of the upper ends of the tombstones 3.

A modification, particularly of the induction coil construction, is shown in FIGS. 9 and 11, illustrating the complete assembly, and of FIGS. 10 and 12 to 20 inclusive showing the individual elements of the assembly.

Referring more particularly to FIGS. 9, 10 and 11, the tombstones 15 and 16 of lead or other fusible material are surrounded by an induction coil assembly comprising two coils outside of tombstone 15 and two coils outside of tombstone 16. More specifically, as better shown in FIGS. 10 and 11, lead-in 10 conducts current through coils 10a and 10b wound in the same direction. Coil 10b is butt-brazed at 9 to a pair of coils 11a, 11b, which pair of coils is wound in an opposite direction to coils 10a, 10b.

Figure 12:
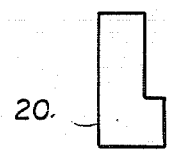
FIGS. 12 and 13 are front and side views, respectively, of a ferrite block.
Figure 13:
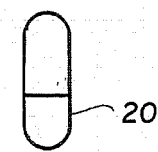

An insulating partition 17 of polypropylene, or the like, has a hole 2a sandwiched between the vertical portions of the tombstones 15 and 16. A glass-filled Teflon mold 12 is provided to confine the molten upper portion of tombstones 15 and 16. A ferrite block 20, whose shape is better illustrated in FIGS. 12 and 13, is inserted within the respective coil turns 10a, 10b and 11a, 11b. The purpose of the ferrite block is to intensify the induction heating effect of coils 10a, 10b, 11a, 11b onto the terminal post and bushing ends and melt to greater fusion depths.

An electrical insulating sheet of Teflon 18 (FIGS. 9 and 11) is placed between lead blocks 19. Electrical insulating support blocks 21 (FIGS. 14–15) of Glastic or similar material is provided. Clamp 13, preferably of copper, surrounds the glass-filled Teflon mold 12 so that upon tightening of the screws shown thereon, the inner surfaces of mold 12 will be tightly pressed against the vertical surface portions of the tombstones 15, 16 on the inner surfaces of the mold 12 to prevent leakage of the fused lead upon energization of the coil by alternating current.

Figure 14:
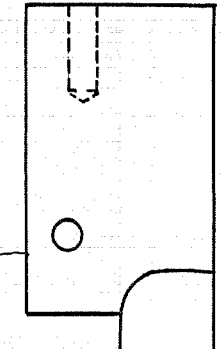
FIGS. 14 and 15 are front and side views, respectively and FIG. 20, a top view of electrical insulating support blocks.
Figure 15:
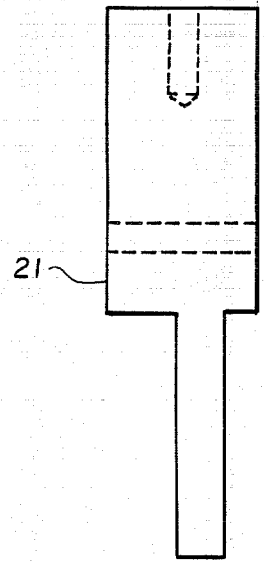
Figure 16:
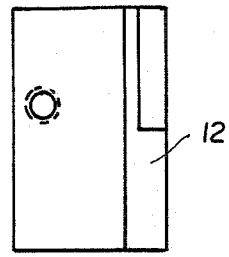
FIGS. 16, 17, 18 and 19 are front, side, top and rear views, respectively, of a Glastic support block.
Figure 17:
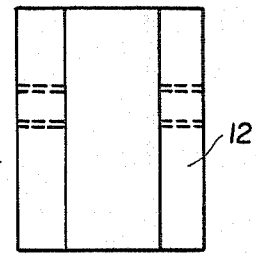
Figure 18:
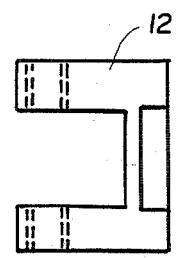
Figure 19:
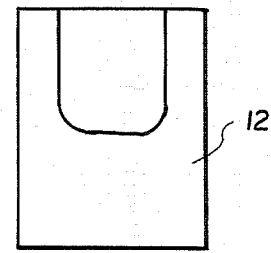
Figure 20:
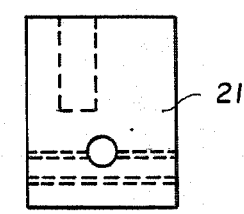

FIGS. 16, 17, 18 and 19 better illustrate the shape of the Teflon mold 12 being front, side, top and rear views, respectively. Likewise FIGS. 14, 15 and 20 show front, side and top views, respectfully, of the Glastic support block included in the assembly of FIG. 9.

Thus it will be seen that I have provided a novel and highly improved method and apparatus for rapidly forming interconnections between tombstone terminals and their supporting partition wherein these terminals are fused in a hole of the partition. The construction is such that it leads itself to "gang" operation of five or even more partitions and their tombstones at one time, greatly speeding production and reducing manufacturing costs.

While I have illustrated and described several embodiments of my invention, it will be understood that these are by way of illustration only and that various changes and modifications may be contemplated in my invention and within the scope of the following claims:

I claim:

1. For use in a battery having flat tombstone type connections, each having a pair of vertical and horizontally outward extending portions of fusible material, each pair of vertical portions snugly surrounding a vertical partition of electrically insulating material having a horizontal hole; intercell fusing apparatus comprising a mold closely surrounding each pair of vertical portions and surrounding a partition portion above said hole, a pair of interconnected inverted U-shaped induction coils snugly surrounded by said mold, and a source of alternating current for energizing said coils at a frequency to fuse the vertical portions of said connections so as to fill said hole.

2. Apparatus as recited in claim 1 wherein said mold has horizontally outwardly extending portions snugly overlying said horizontally outward extending portions of fusible material and wherein said coils have horizontally outwardly extending portions snugly overlying said outwardly extending portions of said mold.

3. Apparatus for "gang" operation of a plurality of apparatus recited in claim 1 wherein the pairs of coils are serially connected to all other pairs of coils.

4. Apparatus as recited in claim 1 wherein each of said inverted U-shaped coils has a double winding on each side, one double winding being wound in one direction and the other double winding being wound in an opposite direction.

5. Apparatus as recited in claim 1 together with blocks of ferrite insulating material included in the winding of said coils.

6. Apparatus as recited in claim 1 wherein the frequency is about 275 Khz and the heating time about 4.2 seconds and the cooling time about 4 seconds.

7. Apparatus as recited in claim 1 together with clamping means for clamping said mold and coils against the walls of said partition to prevent leakage.

8. Apparatus as recited in claim 4 together with clamping means for clamping said mold and coils against the walls of said partition to prevent leakage.

* * * * *